United States Patent
Zhang et al.

(10) Patent No.: US 10,509,860 B2
(45) Date of Patent: Dec. 17, 2019

(54) ELECTRONIC MESSAGE INFORMATION RETRIEVAL SYSTEM

(71) Applicants: Yong Zhang, Ogden, UT (US); Ning Liu, Beijing (CN)

(72) Inventors: Yong Zhang, Ogden, UT (US); Ning Liu, Beijing (CN)

(73) Assignee: Weber State University Research Foundation, Ogden, UT (US)

( * ) Notice: Subject to any disclaimer, the term of this patent is extended or adjusted under 35 U.S.C. 154(b) by 0 days.

(21) Appl. No.: 15/429,094

(22) Filed: Feb. 9, 2017

(65) Prior Publication Data

US 2017/0228361 A1    Aug. 10, 2017

Related U.S. Application Data

(60) Provisional application No. 62/457,069, filed on Feb. 9, 2017, provisional application No. 62/293,570, filed on Feb. 10, 2016.

(51) Int. Cl.
*G06F 17/27* (2006.01)
*G06F 16/332* (2019.01)
*G06F 16/33* (2019.01)

(52) U.S. Cl.
CPC ...... *G06F 17/2705* (2013.01); *G06F 16/3329* (2019.01); *G06F 16/3347* (2019.01); *G06F 17/2785* (2013.01); *G06F 17/277* (2013.01); *G06F 17/2755* (2013.01)

(58) Field of Classification Search
CPC ............ G06F 17/2705; G06F 17/3069; G06F 17/2785
See application file for complete search history.

(56) References Cited

U.S. PATENT DOCUMENTS

| | | | |
|---|---|---|---|
| 7,444,356 B2 | 10/2008 | Calistri-Yeh | |
| 8,275,803 B2 | 9/2012 | Brown et al. | |
| 2011/0270604 A1* | 11/2011 | Qi | G06F 17/271 704/9 |
| 2013/0138641 A1* | 5/2013 | Korolev | G06F 17/2785 707/730 |
| 2014/0095418 A1* | 4/2014 | Scholand | G06F 17/279 706/46 |

OTHER PUBLICATIONS

International Search Report for application No. PCT/US17/17318 dated Jun. 8, 2017.

* cited by examiner

*Primary Examiner* — Vu B Hang
(74) *Attorney, Agent, or Firm* — Workman Nydegger

(57) ABSTRACT

A computer system for parsing bulk message information into intelligent question retrieval models receives text-based data associated with a particular user. The system encodes the word into a context-dependent vector, wherein the context-dependent vector indicates the meaning of the word across a semantic space. The system also identifies within a context-independent database a context-independent vector that is associated with the word. Further, the system generates an objective output by combining the context-dependent vector and the context-independent vector. Further still, the system generates a sentence encoding representation by processing at least a portion of the text-based data through a high-level feature embedded convolutional semantic model to generate numerical representations of questions and answers within the text-based dataset. The sentence encoding representation is generated at least in part based upon the objective output.

20 Claims, 6 Drawing Sheets

ELECTRONIC MESSAGE INFORMATION RETRIEVAL SYSTEM

CROSS-REFERENCE TO RELATED APPLICATIONS

This application claims the benefit of and priority to U.S. Provisional Patent Application Ser. No. 62/293,570 filed on 10 Feb. 2016, entitled "Electronic Message Information Retrieval System," and also U.S. Provisional Patent Application Ser. No. 62/457,069 filed 9 Feb. 2017, entitled "Concept Embedded Convolutional Semantic Model for Question Retrieval." All of the aforementioned applications are incorporated by reference herein in their entirety.

BACKGROUND

Computers and computing systems have affected nearly every aspect of modern living. Computers are generally involved in work, recreation, healthcare, transportation, entertainment, household management, etc. One particular area of computer technology that has seen exponential growth is in relation to large data processing. Technologies have sought to find more efficient and more accurate ways of dealing with tremendous volumes of data. For example, Information Retrieval (IR) systems such as search engines and Questions and Answering (QA) systems have been broadly implemented to retrieve information.

One exemplary source of large amounts of information is contained in electronic messages which are sent for work and personal correspondence. Electronic messages, however, pose unique challenges to data management and IR. For example, data within electronic messages is generally only pertinent and readily accessible by the parties included in the communication threads. Additionally, the resulting data tends to comprise small cells of information that comprise low information density and that lack context making them difficult to analyze for some machine learning approaches that rely on large bodies of data to provide reliable accuracy.

Implementing a computer system that is capable of intelligently processing conversational data is associated with several significant technical problems. For example, many conventional systems suffer from a lexical gap. Lexical gap exists when the words within a statement having different forms share the same meaning. For example, simple examples such as "how to get rid of stuffy nose?" and "how to prevent a cold?", are both associated with the same concept and resulting answer, but both questions are composed of significantly different words. While human minds are easily able to identify the common solution to both questions, computer-based systems are presented with significant technical challenges in identifying the commonality.

An additional technical challenge that is presented to computer systems relates to polysemy. Polysemy occurs when a word reveals different senses as the context changes. For example, the word "apple" may refer to a "computer company" or a type of "fruit" according to its context. Similar to the lexical gap problems, this is a problem that human minds are naturally able to overcome, but computer-based systems have significant challenges it distinguishing between the meaning of words based on context.

Another technical challenge relates to word order within statements. For example, sometimes two questions express totally different meanings though they have same words. For example, the sentences "does the cat run faster than a rat?" and "does the rat fun faster than a cat?" comprise the same words but have very different meanings.

Yet another technical challenge relates to data sparsity. When training a computer system to properly identify context, conventional systems utilize large data sets. In some cases, though, a large dataset may not be available, or a large dataset may dilute the actual desired dataset. As such, it would be desirable to provide systems and methods that are capable of accurately relying upon small datasets.

In view of the above, there exists a need to have an IR system that retrieves content from electronic messages and that quickly and accurately analyzes and stores the information for later use. In particular, there is a need for systems and methods of accomplishing this task despite the low information density and sparse context associated with electronic messages. The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a computer system for parsing bulk message information into intelligent question retrieval models. The computer system comprises one or more processors and one or more computer-readable media having stored thereon executable instructions that when executed by the one or more processors configure the computer system to perform various act. For example, the system receives text-based data associated with a particular user. The system then parses a word from the text-based data. Additionally, the system encodes the word into a context-dependent vector, wherein the context-dependent vector indicates the meaning of the word across a semantic space. The system also identifies within a context-independent database a context-independent vector that is associated with the word. Further, the system generates an objective output by combining the context-dependent vector and the context-independent vector. Further still, the system generates a sentence encoding representation by processing at least a portion of the text-based data through a high-level feature embedded convolutional semantic model to generate numerical representations of questions and answers within the text-based dataset. The sentence encoding representation is generated at least in part based upon the objective output.

An addition disclosed embodiment includes a method for parsing bulk message information into intelligent question retrieval model. The method includes receiving text-based data associated with a particular user. The method also includes parsing a word from the text-based data. Additionally, the method includes encoding the word into a context-dependent vector, wherein the context-dependent vector indicates the meaning of the word across a semantic space. The method also includes identifying within a context-independent database a context-independent vector that is associated with the word. The context-independent database comprises mappings of various words to various context-independent vectors based upon definitions of the various words. In addition, the method includes generating an objective output by combining the context-dependent vector and the context-independent vector. Further, the method includes generating a sentence encoding representation by processing at least a portion of the text-based data through a high-level feature embedded convolutional semantic model to generate numerical representations of questions and answers within the text-based dataset. The sentence encoding representation is generated at least in part based upon the objective output. Further still, the method includes storing the sentence encoding representation within a user-specific dataset that is associated with the particular user.

A further disclosed embodiment includes a computer system for parsing bulk message information into intelligent question retrieval models. For example, the system receives text-based data associated with a particular user. The system identifies adjacency pairs within the words, wherein the adjacency pairs comprise two parts that are communicated by different parties in which a first part is conditionally related to a second part. The system encodes the word into a context-dependent vector, wherein the context-dependent vector indicates the meaning of the word across a semantic space. Further, the system identifies within a context-independent database a context-independent vector that is associated with the word. The context-independent database comprises mappings of various words to various context-independent vectors based upon definitions of the various words. Further still, the system generates an objective output by combining the context-dependent vector and the context-independent vector.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Embodiments disclosed herein provide significant technical advantages over the art of record. For example, disclosed embodiments provide solutions to lexical gap problems, polysemy problems, word order problems, and/or data sparsity problems within a single model. Disclosed embodiments encode concept embedding and word embedding from both context-dependent and context-independent views. Additionally, disclosed embodiments directly learn a question vector representation using a high-level feature embedded convolutional semantic model, which takes the contextual word embedding as input instead of raw text features.

As such, disclosed embodiments provide systems and methods for information retrieval (also referred to herein as "question retrieval") that are capable of accurately operating on small datasets. For example, disclosed embodiments are capable of executing from a user's mobile phone and generating an information retrieval system within the user's mobile phone based upon the communication data on the user's mobile phone. As such, data that is retrieved from the user's mobile phone will be presented in a similar way to the user's natural expression. In contrast, when relying upon a large, multi-user dataset, the user's natural expression may be diluted or completely erased from any resulting data.

As used herein, the typical target for the disclosed information retrieval systems is referred to as text-based data. Text-based data comprises any text data typically sent in communication, such as emails, SMS texts, html received through a web browser, documents, pdfs, and any other electronic format that is capable of storing text that is directed to or from a particular user. As used herein, when referring to any of these particular format types individually, one will understand that any text-based data can also be used. In any case, disclosed embodiments are capable of parsing words within the text-based data to identify individual words, sentences, paragraphs, and sections.

Figure 1:
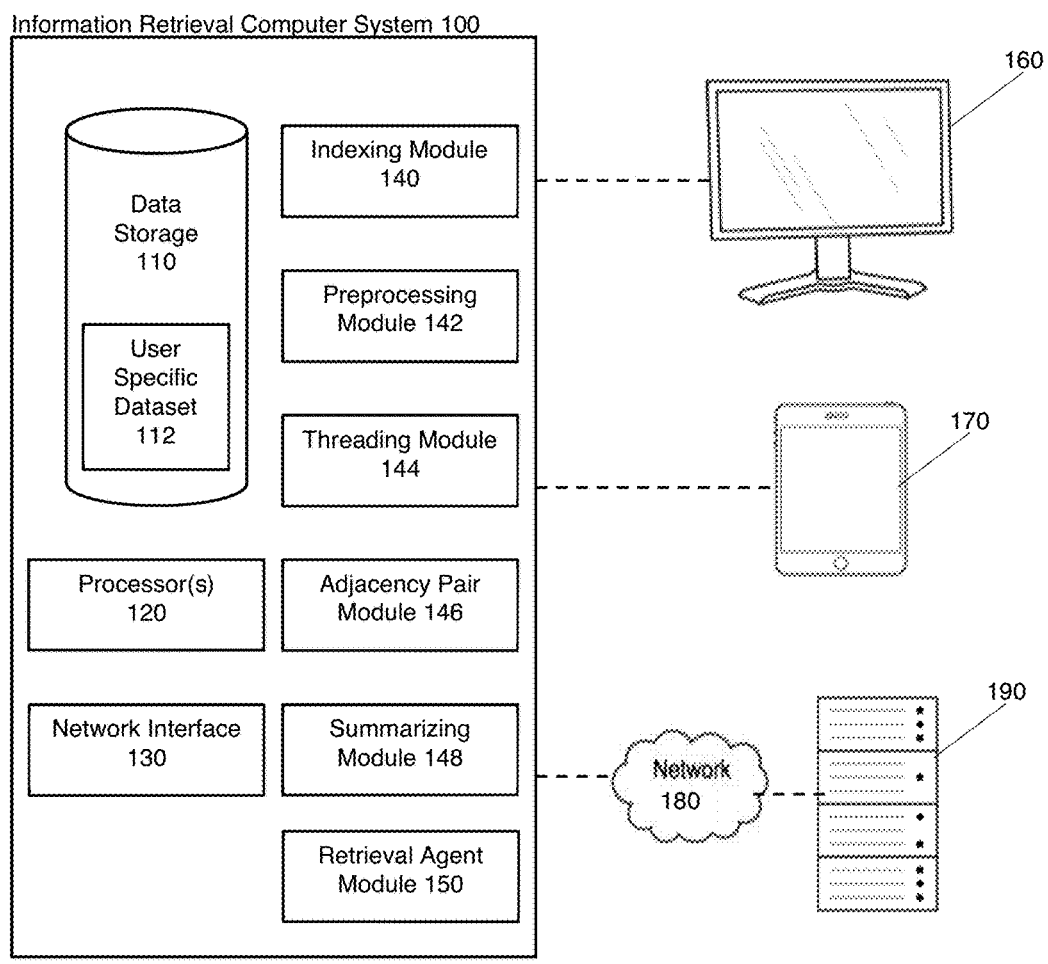
FIG. 1 illustrates a schematic diagram of an embodiment of an information retrieval computer system.

Turning now to the figures, FIG. 1 depicts a schematic of an information retrieval computer system 100. In the depicted embodiment, the information retrieval computer system 100 comprises data storage 110, processor(s) 120, a network interface 130, an indexing module 140, a preprocessing module 142, a threading module 144, an adjacency pair module 146, a summarizing module 148, and a retrieval agent module 150. The information retrieval computer system 100 is also shown as being in communication with a variety of different possible devices, such as a computer system 160, a mobile device 170, and a server 190 through a network 180. One will understand, however, that the depicted embodiment of the information retrieval computer system 100 is provided only for a sake of example and explanation. In alternative embodiments, the modules and components may be otherwise depicted, described, combined, or separated. As such, the depicted schematic does not limit other embodiments of the invention to any particular form or description.

In one exemplary embodiment, information retrieval approaches may be employed to resolve problems associated with information management in electronic messages. In contrast to real-time and in-person communications, electronic messages often result in difficult-to-track content and parties. For example, electronic messages are often interspersed and interrupted by activities and other communications. Electronic messages are also not as constrained by geo-temporal proximity as real-time and in-person communications and as a consequence may provide fewer contextual cues for the parties.

Often electronic messages are expected to not only convey meaning, but be personalized. Parties may exhibit idiosyncratic communication styles in which their word usage and sentence structures vary from general populations. The same individual's communication styles may be subject to change based on the audience and the context of the communication. For an example, professionals use specialized language in the practice of their profession, but these same professionals may not be likely to use this specialized language in nonprofessional settings. Conventional systems for automatically generating response data have a globalized approach in which generated responses are based on frequencies of use among a general population using a particular platform. As a consequence, these generated responses are not personalized to a party's style and are restricted in word count to avoid alerting the recipient that the response is automated. The restricted word count further limits the responsiveness of the automated response where the initial communication has specific facts and details which require a more thorough response.

Disclosed embodiments provide a dynamic information retrieval system for electronic messages. In various embodiments, the information retrieval computer system 100 is in communication with a computer system 160, a mobile device 170, a server 190 over a network, or any number of other computer-based systems. Further, in at least one embodiment, the information retrieval computer system 100 is executed on one or more of the above-mentioned computer-based systems 160, 170, 180.

At least one disclosed embodiment utilizes processes and apparatuses to extract adjacency pairs and summaries from text-based data, such as emails, messages, chats, or other similar data that is received through one or more of the above referenced computer-based systems 160, 170, 180. These processes and apparatuses index and store identified adjacency pairs and summaries in a data storage 110. The invention includes a retrieval agent module 150 that retrieves text from the data storage 110 that relates to drafting first party communications.

As used herein, adjacency pairs comprise text portions that have two parts which are communicated by different parties in which a first part is conditionally related to second part. Adjacency pairs include all conditionally related communication acts between parties such as questions and answers (e.g. 'How much,' 'Five dollars'), greeting pairs ('Dear John,' 'Bob'), salutation pairs ('Sincerely, Bob,' 'Cheers, John'), offer and acceptance/counteroffer/rejection pairs ('I'll pay three dollars,' 'Okay'), command pairs ('Go to sleep,' 'No'), apology pairs ('I'm sorry,' 'It's fine') and information pairs ('I went skiing,' 'Sounds fun').

In at least one disclosed embodiment the information retrieval computer system 100 performs two steps: (1) a word and concept learning step and (2) a question and answer embedding learning step. The word and concept learning step learns the semantic relations between words for resolving the lexical gap problem and learns the concept embedding for resolving the polysemous problem. The output of word and concept learning step are word embeddings of words and concept embeddings of concepts. The question and answer embedding learning step learns the sentence embedding representation to obtain the syntactic information from a question. For example, the output of the word and concept learning step encodes the word order information into the question embedding.

Turning now to step 1, in at least one embodiment word embedding is learned from text-based data without supervision by predicting the context of each word or predicting the current word given its context. For example, those of skill in the art will appreciate that the Skip-gram model is capable of word embedding, which comprises learning distributed representations of words. In at least one embodiment, the meaning of a word can be obtained empirically by examining the context in which the word appears. The words are then represented as context-dependent vectors and their meanings are distributed across the dimensions of a semantic space.

In at least one embodiment, when processing text-based data, each word is associated with an intrinsic vector that maintains the unique features of the word. Each concept is analogously assigned a vector that delivers an unambiguous meaning. The contextual representation of a word is then obtained by combining its intrinsic vector and the most context-appropriate concept vector.

For example, a first query may be directed towards [orange fruit] and a second query may be directed towards [orange color]. The embedding of the first "orange" is obtained by combining the intrinsic vector of "orange" and the concept vector of "fruit". In contrast, the embedding of the second "orange" is obtained by combining the intrinsic vector of "orange" and the concept vector of "color". The particular embedding scheme is provided only for the sake of example and explanation. One having skill in the art will appreciate that alternative embedding schemes can be used based on particular needs.

In at least one embodiment, the task of choosing a word to fit in the context can be reduced to two steps: locating the right concept and then searching for a word underneath the chosen concept. The resulting objective function, which generates an objective equation, is:

$$J(\theta_{in}, \theta_{cn}) = \frac{1}{T} \sum_{t=1}^{T} \sum_{-l \leq j \leq l, j \neq 0} \log p(w_{t+j} | w_t)$$

$$p(w_{t+j} | w_t) = p(e_{t+j} | w_t) p(w_{t+j} | w_t, e_{t+j})$$

where $w_t$ and $w_{t+j}$ represent the target word and contextual word respectively, l is the size of context window centered at the target word $w_t$. $\theta_{in}$ denotes the intrinsic vectors that should learned, and $\theta_{cn}$ denotes the concept vectors that should learned. The conditional probability $p(w_{t+j}|w_t)$ is computed using a log-linear softmax function. t+j denotes the concept of $w_{t+j}$ in the given context.

In at least one embodiment, to function properly the above equations must select the right concept before calculating the conditional probability. One will understand that selecting the wrong concept will result in errors. Accordingly, at least one embodiment utilizes a context-independent database to identify potential context-independent vectors. Further, in at least one embodiment, the context-independent database comprises mappings of various words to various context-independent vectors based upon definitions of the various words and without insight into the actual sentences that are being analyzed. The context-independent database may be located within data storage 110 or within any other accessible data storage system, such as a storage systems associated with a server 190. Using the context-independent database, at least one embodiment is able to determine whether the context-dependent vector calculated from the analyzed text matches a context-independent vector that is provided by the context-independent database. If a match is present, there is a great probability that the correct concept was selected.

Additionally, in at least one embodiment, word sparsity may cause two related words to appear in different context windows 1. For example, the relation between "sofa" and "bed" may be miss, if they do not co-occur in a context window. However, if two words share the same concept in the context-independent database, they will be enhanced directly from the context-independent view, despite not appearing the same context window 1.

Figure 2:
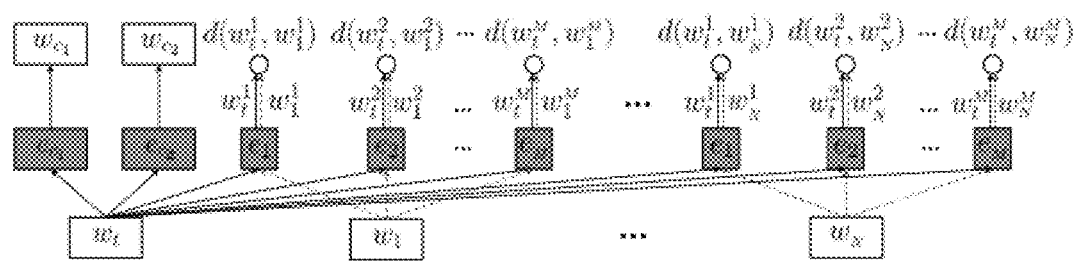
FIG. 2 illustrates a schematic diagram of an embodiment of a model for encoding words and/or concepts.

Accordingly, in at least one embodiment, a regularization function derived from the concept information is added to the Skip-gram objective function in a context-independent way, which focuses on leveraging the concept information in the knowledge base in a context-independent way. For example, as shown in FIG. 2, if two words share the same concept in a knowledge base, disclosed embodiments acquire the concept and model it in addition to the context to achieve certainty and directness. For instance, let $s_m(w_t, w_i)$ be the similarity score between $w_t$ and $w_i$ towards the $m_{th}$ concept $e_m$ in the whole concept space, and the following heuristic is used to constrain the similar score:

$$s_m(w_t, w_i) = \begin{cases} 1 & \text{if } e_m \in (C(w_t) \cap C(w_i)) \\ 0 & \text{otherwise} \end{cases}$$

where $C(w_t)$ and $C(w_i)$ denote the concept sets which $w_t$ and $w_i$ belong to. In other words, if the central word $w_t$ and word $w_i$ share the same concept $e_m$, their similarity score of the $m_{th}$ concept will become 1, otherwise, the score will become 0.

In at least one embodiment, the concept information is encoded using a regularization function $R_c$:

$$R_c = \sum_{t=1}^{N} \sum_{i=1}^{N} \left( \frac{1}{M'} \sum_{m=1}^{M} s_m(w_t, w_i) d(w_t^m, w_i^m) \right)$$

where M denotes the number of whole concepts (e.g., context-independent vectors) in the context-independent database (also referred to herein as knowledge base) and M' denotes the number of concepts that $w_t$ and $w_i$ share. At least one disclosed embodiment loops through the intersection concept set of $w_t$ and $w_i$ instead of the whole set. $w_t^m$ and $w_i^m$ are the word $w_t$ and $w_i$ combining with the $m^{th}$ shared concept name. $d(w_t^m, w_i^m)$ is the distance between the words in the contextual word embedding space and $s_m(w_t, w_i)$ serves as a weight function. For similarity, $d(w_t^m, w_i^m)$ can be denoted as the cosine similarity between $w_t^m$ and $w_i^m$.

In at least one embodiment, the following equation is used to combine the word vector and the concept vector:

$$w_t^m = (1-\lambda)w_t + \lambda c_m$$

where $w_t^m$ denotes the combination embedding representation of $w_t^m$, $w_t$ denotes the embedding representation of $w_t$, $c_m$ denotes the embedding representation of the $m^{th}$ shared concept $c_m$, and $\lambda$ controls the relative importance between the two types of embeddings. In at least one embodiment, the relative importance is set to 0.45.

In at least one embodiment, after combining the objective function and the regularization function, an objective output $J_c$ is obtained. The objective function incorporates concept information into the training process from context-independent vectors and context-dependent vectors:

$$J_c = (\theta_{in}, \theta_{cn}) + \beta R_c$$

where $\beta$ is the combination coefficient, which in at least one embodiment is set to 0.05. At least disclosed embodiments maximizes the combined objective function Jc. For example, the objective function can be optimized by using back propagation neural networks. In at least one embodiment, the dimension of the concept embedding and word embedding is set to 300, the windows size 1 in Skip-gram part is set to 5, the learning rate is set to 0.02 and $\beta$ is set to 5 in this work. This particular model is referred to herein as a concept powered model ("CPM") for easy reference.

While embedding words and concepts is a beneficial process for information retrieval systems, embedding representations of large text, e.g., sentence and document, are more impactful in real applications, such as similar question retrieval in community question answering, web search, etc., because the sentence or paragraph embedding can keep more syntactic information compared with words. In at least one embodiment, after obtaining the embedding of the question, the information retrieval computer system 100 evaluates the cosine similarity of two questions using the following equation:

$$\cos(q_1, q_2) = \frac{q_1 \cdot q_2}{\|q_1\| \|q_2\|}$$

where $q_1$, $q_2$ denote two questions, and $q_1$, $q_2$ denote the embedding representation of $q_1$, $q_2$. If two questions are similar, the cosine similarity will close to 1, otherwise the cosine similarity will close to −1. Thus, in at least one embodiment, the information retrieval computer system 100 uses a cosine similarity to rank candidate questions in the question retrieval task in this work.

In at least one embodiment, to encode the concept information and syntactic information, especially the word order information, into the sentence embedding, the information retrieval computer system 100 utilizes a model called high-level feature embedded convolutional semantic model (HCSM) to generate the embedding representations of questions and answers in the question answer (QA) data. In at least one embodiment, the QA data is stored within the data storage 100. Further, in at least one embodiment, the QA data, including sentence encoding representations, is stored within a user specific dataset 112 such that each individual user develop a customized data set of information for information retrieval purposes.

Given a QA dataset $P=\{(q_i, a_i) | 1 \le i \le N\}$, where $(q_i, a_i)$ is the $i^{th}$ question-answer pair in the dataset, $q_i$ and $a_i$ denote the question and answer of this pair, and N is the number of question-answer pairs in this dataset collection. The question $q_i$ of the $i^{th}$ pair is composed of a sequence of words $q_i = \{w_{ij}^a, 1 \le j \le N_i^q\}$, where $N_i^q$ denotes the length of $q_i$. Similarly, the answer $a_i$ of the $i^{th}$ pair is composed of a sequence of words $a_i = \{w_{ij}^a, 1 \le j \le N_i^q\}$, where $N_i^a$ denotes the length of $a_i$.

Once the word embedding and the concept embedding are learned, the $q_i$ (or $a_i$) can be represented by a word embedding matrix and a concept embedding matrix respectively.

With regard to the word embedding matrix, the $q_i$ and $a_i$ are represented as $E_{qi}^w = \{w_{ij}^q, 1 \leq j \leq N_i^q\}$ and $E_{ai}^w = \{w_{ij}^a, 1 \leq j \leq N_i^a\}$, where the bold letters $w_{ij}^q \in R^d$ and $w_{ij}^a \in R^d$ are the d-dimensional word embedding representations of $w_{ij}^q$ and $w_{ij}^a$. With regard to the concept embedding matrix, the $q_i$ and $a_i$ are represented as $E_{qi}^c = \{c_{ij}^q, 1 \leq j \leq N_i^q\}$ and $E_{ai}^c = \{c_{ij}^a, 1 \leq j \leq N_i^a\}$, where the bold letters $c_{ij}^q \in R^d$ and $c_{ij}^a \in R^d$ are the d-dimensional word embedding representations of $w_{ij}^q$ concept and $w_{ij}^a$ concept. Thus, in at least one embodiment, the information retrieval computer system 100 obtains the vector representation $q_i$ and $a_i$ of the question $q_i$ and answer $a_i$.

In at least one embodiment, the information retrieval computer system 100 obtains the vector representation $q_i$ of question $q_i$ by averaging the sum of all the word representations $w_{ij}^q$:

$$q_i = \frac{1}{N_i^q} \sum_{j=1}^{N_i^q} w_{ij}^a$$

As discussed above, various conventional models suffer the data sparsity problem. That is, to learn the model parameters, they need to label large amount of training data so that there is a corresponding label given a sentence. In at least one embodiment, the information retrieval computer system 100 determines that two questions, if having similar answers, could have semantic relations. Thus, the information retrieval computer system 100 uses such relations as the supervised information to train the model. For example, the information retrieval computer system 100 models the sentence matrix using a convolutional architecture that alternates wide convolutional layers and pooling layers. In the network, the width of a feature map at an intermediate layer varies depending on the length of the input sentence.

In at least one embodiment, a convolutional layer in the network is obtained by convolving a convolution kernel $m \in R^{d \times m}$ with the source input matrix. d is the dimension of the input word vector and m is hyper-parameter of the network. The information retrieval computer system 100 uses the wide one-dimensional convolution in this step. Wide convolution means adding zero-padding to the source input matrix. One-dimensional convolution means that each row $m_r$ in m, where $1 \leq r \leq d$, is just operated on the corresponding $r^{th}$ dimensional (row) vector of $E_{qi}^w$ or $E_{qi}^c$.

For example, the second layer is obtained by applying a convolutional kernel m to the input word embedding question matrix $E_{qi}^w \in R^{d \times N_i^q}$, and has dimensions $d \times (N_i^q + m - 1)$. Thus, after the wide one-dimensional convolutions, the number of rows of the result matrix is still d. Besides, a bias $b \in R^d$ and a non-linear function g are applied component-wise to the convolved matrix after convolving.

Additionally, in at least one embodiment, the information retrieval computer system 100 performs a pooling function. For example, the information retrieval computer system 100 applies an average-pooling operator in the network after the topmost convolutional layer. This guarantees that the generated question or answer vector can keep more important information. In addition, the information retrieval computer system 100 uses the dynamic k-max pooling after each intermediate convolutional layer. The information retrieval computer system 100 uses the following function to calculate the k:

$$k_l = \left\lceil \frac{L-l}{L} s \right\rceil$$

where l is the number of the current convolutional layer to which the pooling is applied and L is the total number of convolutional layers in the network; s is the length of input question or answer. For example, for an input sentence of length s=8, the pooling parameter at the first layer is $k_1 = 4$.

Figure 3:
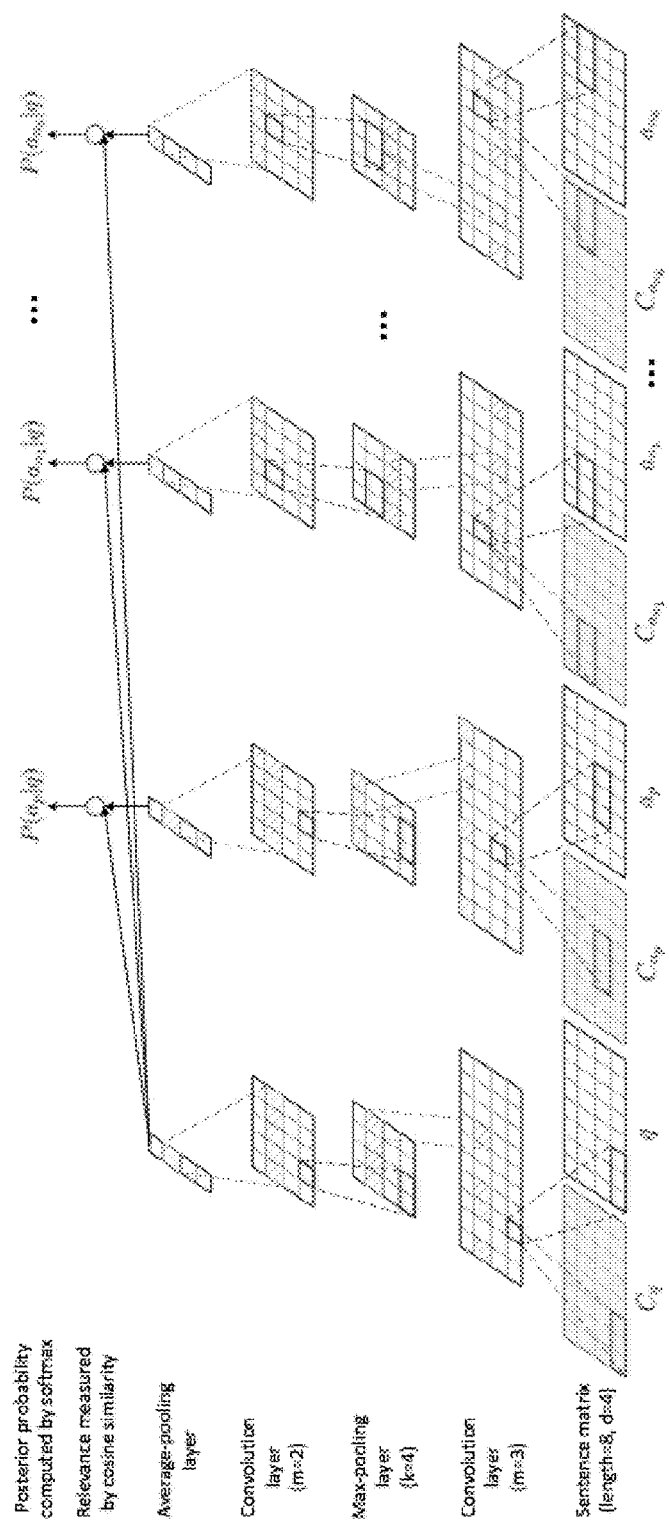
FIG. 3 illustrates a schematic diagram of an embodiment of a model used in leaning a question vector.

In one exemplary embodiment, the information retrieval computer system 100 emphasizes three types of relationships: the relation between concepts, the relation between words, and the relation between concept and word. As shown in FIG. 3, two different convolution kernels $m_1^c$ and $m_1^w$, which encode the concepts relation and words relation, are used to convolve the input word embedding question matrix $E_{qi}^w$ and concept embedding question matrix $E_{qi}^c$. The first convolution layer is obtained by using the following equation to combine the convolutional results from $E_{qi}^w$ and $E_{qi}^c$.

$$Y = (1-\lambda)Y_w + \lambda Y_c$$

$$Y_w = E_{qi}^w * m_1^w$$

$$Y_c = E_{qi}^c * m_1^c$$

where Y is the first convolution layer, "*" is the wide convolution symbol and $\lambda$ controls the relative importance between the two types of results. The information retrieval computer system 100 can determine the optimal value of $\lambda$ via a grid search in a small validation set. As shown in FIG. 3, after the first special convolution layer, the wide convolutional layers and pooling layers alternately appear in the architecture. As such, this embodiment comprises a variant of the High-Level Feature Embedded Convolutional Semantic Model (HCSM-1).

Figure 4:
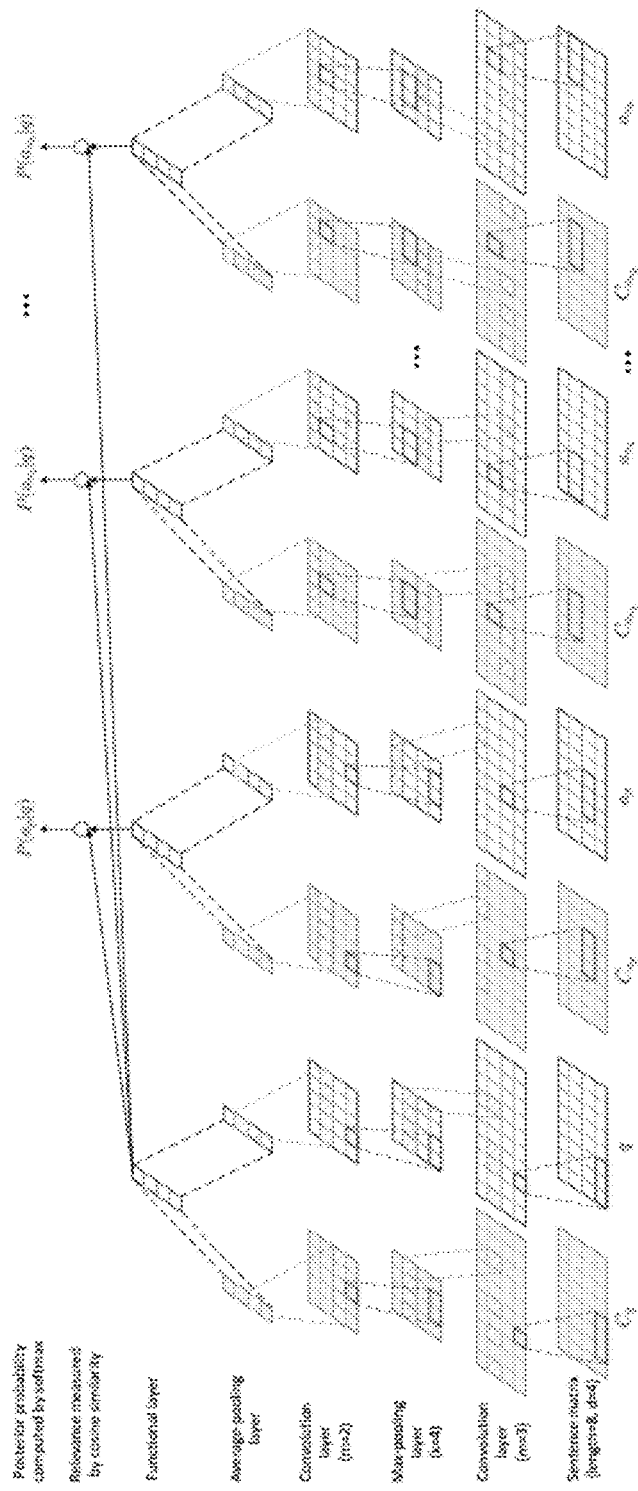
FIG. 4 illustrates a schematic diagram of another embodiment of a model used in leaning a question vector.

In the second exemplary embodiment), the information retrieval computer system 100 emphasizes more about the relation between concepts and the relation between words. The information retrieval computer system 100 considers the relation between concept and word in the end of the architecture. As shown in FIG. 4, the information retrieval computer system 100 builds two distinct networks for the word embedding question matrix and concept embedding question matrix, namely the convolution kernels of the two networks are different. As used herein the two networks re referred to as word network and concept network, respectively. After the last pooling layer, average-pooling layer, the information retrieval computer system 100 adds a functional layer on top of the last pooling layer. The functional layer uses the following equation to combine the two pooling results from the two networks.

$$Y = (1-\lambda)A_w + \lambda A_c$$

where Y is the output of the functional layer, $A_w$ and $A_c$ are the average-pooling layer results of the word network and concept network. $\lambda$ controls the relative importance between the two types of results. The optimal value of $\lambda$ can be decided via grid search in a small validation set. We can also generate the Y by concatenating the $A_w$ and $A_c$.

In an additional embodiment, the information retrieval computer system 100 can also directly combine the word embedding question matrix and concept embedding question matrix before inputting them to the network according to the following equation:

$$E_{qi} = (1-\lambda)E_{qi}^w + \lambda E_{qi}^a$$

where $E_{qi}$ is the combination result. Then the convolutional network takes $E_{qi}$ as input.

One of skill in the art will understand that the above disclosure with respect to the question matrix also applies to the answer matrix. The output of the above disclosed embodiments is a question or answer vector in a low-dimensional semantic feature space.

As mentioned above, the question-answer pairs act as the labeled data in the disclosed model. In at least one embodiment, the information retrieval computer system 100 maximizes the conditional likelihood of the correct answer given the question to learn our model parameters, i.e., convolution filter m and bias b. First, the information retrieval computer system 100 computes the posterior probability of an answer given a question from the semantic relevance score between them through a softmax function:

$$P(a \mid q) = \frac{\exp(\gamma R(q, a))}{\sum_{a' \in A} \exp(\gamma R(q, a'))}$$

$$R(q, a) = \frac{q \cdot a}{\|q\| \|a\|}$$

where γ is a smoothing factor in the softmax function, which is set empirically on the validation data set in our experiment. R(q,a) denotes the semantic relevance score between the question q and the answer a. q and a are the vector representation of the q and the a output by the convolutional network. A denotes the set of candidate answers to be ranked. Ideally, A should contain all of the answers in the question-answer pairs P. In at least one embodiment, for each question-answer pair (q, $a^+$), where q denotes the question and $a^+$ denotes the corresponding answer, the information retrieval computer system 100 constructs A by including $a^+$ and four randomly selected other answers from P. In training, the information retrieval computer system 100 minimizes the following loss function to estimate the model parameters:

$$L(\theta) = -\log \prod_{q, a^+} P(a^+ \mid q)$$

where θ denotes the model parameters m and b, the model is trained by a gradient-based numerical optimization algorithm.

In at least one embodiment, an information retrieval computer system 100 utilizing a model with only two convolutional layers and pooling layers performs better than conventional methods. Various disclosed embodiments provide several benefits. For example, in at least one embodiment, there is no need to manually label the data for training the network. The question-answer pairs are used to train the network instead. Additionally, in at least one embodiment, the relation between the question and the answer is encoded into their vector representations. Further, in at least one embodiment, the information retrieval computer system 100 takes the word vector matrix and concept vector matrix instead of raw text feature as the input so that the concept information in each question or answer is incorporated into the sentence vector. Posterior probability computed by softmax. Additionally, the convolutional operation can efficiently encode the word order information into the sentence vector. And the max-pooling operation can efficiently select which word is more important.

Returning now to the schematic of FIG. 1, in an embodiment of the invention, the indexing module 140 is operably connected to the data storage 110. Further, in at least one embodiment, the indexing module 140 functions as a gateway to the data storage 110 for the other aforementioned modules so all input and output stored and retrieved from the data storage for these other modules operably passes through the indexing module 140 for fast retrieval.

The indexing module 140 defines the text and features of the electronic communications to be indexed and index the text and features of the electronic communications. The indexing module 140 also searches the index and retrieving indexed text and features of the electronic communications from the data storage 110.

In at least one embodiment, the preprocessing module 142 accesses each email communication from the text-based data. The preprocessing module 142 can employ and pipeline natural language processing (NLP) sub-processes to extract features from the data set of text, such as features from an email communication. One skilled in the art will appreciate the array of NPL sub-processes and pipeline sequences that can be used to extract email communication features.

The preprocessing module 142 can also employ lower-level NLP sub-processes in pipelined sequences, concurrently, and/or asynchronously. The lower-level NPL sub-processes include, but are not limited to, one or more the following sub-processes: a lexical analysis sub-process includes decomposing electronic communications into their constituent parts (tokenization) and sentence detection (e.g. 'The man sat on the red bench.' s-expression (sentence (word The) (word man) (word sat) (word on) (word the) (word red) (word bench))); a part-of-speech (POS) tagging sub-process categorizes words from electronic communications with POS tags such as from the Penn Treebank tag set; a lemmatization sub-process groups various inflected forms of a word into a single lemma; a stemming sub-process groups various inflected forms by either using look-up tables or suffix striping algorithms; a word embedding sub-process computes feature vectors for words through methods such as a skip-gram with negative sampling (SGNS) and continuous bag of words; a shallow parsing (chunking) sub-process identifies constituent phrases and clauses; and a parsing sub-process may use an array of parsing types to decompose electronic messages and translate them into at least one or more of the following grammar structures: dependency grammar, slot grammar, Penn Treebank grammar, lexical functional grammar (NP-complete), probabilistic context-free grammar (PCFG), head-driven phrase structure grammar.

In at least one embodiment, the preprocessing module 142 pipelines output from the lower-level NPL sub-processes into higher-level NLP sub-processes. The preprocessing module 142 employs the higher-level NLP sub-processes in pipelined sequences, concurrently, and/or asynchronously. The higher-level NLP sub-processes include, but are not limited to an information extracting sub-process which extracts information from the email communication. The information extraction sub-process completes its function through one or more of the following subtasks: spelling or grammatical error identification and recovery, named entity recognition (NER), word sense disambiguation, negation and uncertainty identification, relationship extraction, and temporal inferences/relationship extraction.

In at least one embodiment, the threading module 144 threads email communications. The threading module 144 threads text-based data as it is received by the network interface 130, as it is generated by a user, from the data storage 110, or from any other available source. The threading module 144 an employ threading sub-processes to thread at least two email communications. In at least one embodiment, threading can occur through syntactic sub-processes including the reply/forward mechanisms (e.g. 'Re:,' 'Fw:,' 'In-ReplyTo') in which email communications are analyzed for shared subject lines and other related syntactic threading protocols. Additionally, the threading module 144 employs certain contextual sub-processes to thread email communications. The threading module 144 can thread email communications based on but not limited to one or more of the following sub-processes: identify candidate email communications to be threaded; calculate scores for the candidate email communications; and thread email communications. The scores may be calculated based on relative rankings among candidates' scores or based on scoring methods that are independent from other candidates' scores. As used herein, "score," used both as a noun (including singular, plural, and gerund forms) or verb (including all verb forms), means both the relative and/or independently scoring methods.

The threading module 144 can identify at least two email communications that are likely in the same communication sequence based on contextual sub-processes that include, but are not limited to, one or more the following sub-processes: the correspondence of email identifiers between electronic communications wherein the sharing of at least two or more email identifiers between email communications increases the likelihood that the email communications are in the same communication sequence; the temporal proximity of email correspondence wherein the shorter amount of time between email communications increases the likelihood that they are in the same communication sequence; the sequencing of the email communications wherein the likelihood that email communications are in the same communication sequence increases where, in the first email communication, the first email client is the sender and the second email client is the receiver, and in the second email communication, the second email client is the sender and the first email client is the receiver; and the potential adjacency pair matches between email communications wherein the likelihood that email communications are in the same communication sequence increases where there are potential adjacency pairs between the electronic communications. It is apparent that the threading engine 26 can run these sub-processes concurrently, asynchronously or pipeline them.

The threading module 144 calculates threading scores for email communications based on the likelihood that the email communication are from the same communication sequence. Preferably, the threading module 144 calculates threading scores based on, but not limited to one or more of the following criteria: the correspondence among email identifiers; the temporal proximity between the email communications; the sequence of the email communications; and the adjacency pair matches between email communications. Some aspects of the threading module 144 can weigh the scores of at least two or more of the aforementioned criteria the same and/or differently. In at least one embodiment, the threading module 144 adjusts its calculation of scores of the criteria to determine whether the email communications should be threaded based on intrinsic or extrinsic input. Additionally, in at least one embodiment, the threading module 144 adjusts its weighting of the criteria to determine whether the email communications should be threaded based on intrinsic and/or extrinsic input.

In at least one embodiment, the threading module 144 threads email communications based on the total calculated score of the contextual sub-processes. Further, the threading module 144 can thread all email communications that pass a threshold score. The threading module 144 can adjust the threshold score based on intrinsic and/or extrinsic input.

The threading module 144 is configured to interact with the adjacency pair module 146, hereinafter described, and can thread email communications based on the likelihood of adjacency pair matches between at least two email communications. The threading module 144 can identify at least two email communications that are likely in the same communication sequence based on, but not limited to one or more of the following criteria: the correspondence among email identifiers; the temporal proximity between the email communications; and the sequence of the email communications. The threading module 16 operatively communicates the email communications that are likely in the same communication sequences to the adjacency pair module 146. Then the adjacency pair module 146 can identify, score, and extract potential adjacency pairs from the email communications. Where email communications exhibit high probabilities of being in the same communication sequences based on extractions of adjacency pairs, the adjacency pair module 146 operatively communicates these high probabilities to the threading module 146 so that the threading engine 144 can thread these email communications.

In at least one embodiment, the input for the adjacency pair module 146 either includes text-based data that has been preprocessed in the preprocessing module 142, or text-based data that has been preprocessed in the preprocessing module 142 and threaded in the threading module 144. When the input comprises text-based data that has been preprocessed in the preprocessing module 142 and threaded in the threading module 144, the adjacency pair module 146 can complete certain sub-processes to extract the adjacency pairs from the threaded text-based data. The adjacency pair module 146 can extract adjacency pairs from the threaded text-based data based on, but not limited to one or more of the following sub-processes: identify potential adjacency pairs, calculate ranks and/or scores for the candidate adjacency pairs, and extract adjacency pairs.

In at least one embodiment, the adjacency pair module 146 extracts from secondary party email communications (i.e., text-based data) the first part of the adjacency pair and extracts from first party email communications the corresponding second part of the adjacency pair. The adjacency pair module 146 also extracts from first party email communications the first part of the adjacency pair and extracts from second party email communications the corresponding second part of the adjacency pair.

The adjacency pair module 146 can identify potential adjacency pairs based on, but not limited to one or more of the following criteria: sentence/phrase sequencing, or lexical semantic, and/or grammatical features between sentences. Where the adjacency pair module 146 identifies adjacency pairs based on sentence/phrase sequencing, an embodiment of the adjacency pair module 146 can match sentences/phrases to particular adjacency pair types based on the relative sentence/phrase sequences in the email communications.

In at least one embodiment, as described herein, the adjacency pair module 146 identifies adjacency pairs by matching parsed text to complimentary entries within an adjacency pair database that is stored within the data storage 110. For example, greetings pairs frequently occur at the beginning of email communications; and correspondingly, salutations pairs frequently occur at the end of email communications. The following adjacency pairs often occur in the body of email communications: question and answer pairs, offers and offer and acceptance/counteroffer/rejection pairs, command pairs, apology pairs, and information pairs. In the body of the email communications, the sentences/phrases that form adjacency pairs often occur in relatively the same sequence of their respective email communications. For instance, the adjacency pair module 146 may identify the parsed word "thanks" within a first entry in the adjacency pair database and a complimentary "you're welcome" within a second entry in the adjacency pair database. As further examples of complimentary entries, the bodies of the following email communications demonstrate this pattern: "Thanks for your help this past Friday. I am contacting you to find out whether it would be possible for you to help next Sunday"; and "No problem—I was pleased to help. I unfortunately will not be able to help this Sunday." In this example, the email communications' first sentences form adjacency pairs and the email communications' second sentences form adjacency pairs.

Where the adjacency pair module 146 identifies adjacency pairs based on lexical and semantic features between sentences, an embodiment of the adjacency pair module 146 matches sentences/phrases based, but not limited to on one or more of the following features: tense (past, present, future) correspondence wherein sentences/phrases that have similar tenses are more likely to correspond; noun and verb correspondence in which sentences with similar nouns and verbs are more likely to correspond. In at least one embodiment, the adjacency pair module 146 does not identify adjacency pairs based on correspondence between copular verbs (to be) and/or auxiliary verbs (to be, to do).

The adjacency pair module 146 can also identify adjacency pairs based on sentences/phrases fitting into particular grammatical structures. For example, the adjacency pair module 146 can identify adjacency pair based on sentences/phrases fitting into adjacency pair types such as: question and answer pairs, greeting pairs, salutation pairs, offers and offer and acceptance/counteroffer/rejection pairs, command pairs, apology pairs, and information pairs. The adjacency pair module 146 can compare adjacency pairs that correspond with adjacency pair types' word usage and grammatical structures. For an example, in English, questions often employ interrogatives (e.g. "how," "what," "why," "whether," "when" "how much" "where") and end with question marks (?). In direct questions, interrogatives often begin the sentence and/or modals (e.g. "must/might/may," "can/could," "shall/should," "will/would"); and the auxiliary verbs (e.g. "to do" "to be") proceed subjects. Adjacency pair question/answer often share subjects (except where question/answer pair switch between first person (e.g. first person subject pronouns "I" "we") and second person (e.g. second person subject pronoun "you")) and verbs. With word embedding, lemmatization, and extraction techniques such as NER performed in the preprocessing module 142, variability in subject and verb usages between the question and answer pair is largely normalized. Both greeting and salutation pairs have standardized structures in English correspondence (Greeting Structure=[Greeting Word e.g. 'Dear', or Omitted]+[Secondary Party Name]+[Punctuation e.g. ',' ':' or Omitted]; Salutation Structure=[Salutation Word e.g. 'Cheers' or Omitted][Punctuation ',' or Omitted]+[First Party Name]). Offer and acceptance/counteroffer/rejection pairs can exist in question and answer formats and often have verbs and modals that express intent (e.g., 'offer,' 'accept,' 'reject,' 'am willing,' 'will pay,' 'will not,' 'wish') along with affirmative and negative participles ['yes,' 'no']. In command pairs, the command omits the subject of the sentence (e.g. 'Clean your room') and responses to command follow the patterns exhibited in acceptance/counteroffer/rejection responses.

An embodiment of the adjacency pair module 146 calculates scores for sentences that have been identified as potential adjacency pairs. For example, the adjacency pair module 146 can calculate the scores of these sentences based on, but not limited to one or more of the following criteria: sentence sequencing; or lexical semantic, and/or grammatical features between sentences. Some embodiments of the adjacency pair module 146 can weigh the scores of at least two or more of the following criteria the same and/or differently: relative sentence sequence; relative tense correspondence; relative noun and verb correspondence; and relative sentences/phrases fitting into particular grammatical structures.

The adjacency pair module 146 may make determinations on whether to use certain criteria and the relative weight of the used criteria based on the adjacency pair types. For an example, the adjacency pair module 146 may only select the criteria "the relative sentence sequence" and "the relative sentences/phrases fitting into particular grammatical structures" when the potential adjacency pair is a greeting pair. When sentences form a potential answer question pair, the adjacency pair module 146 may weigh scores in the following descending order in which the first criterion is weighted highest and last criterion is weighted lowest: relative noun and verb correspondence; relative sentences/phrases fitting into particular grammatical structures; relative tense correspondence; and relative sentence sequence. The adjacency pair module 146 can also adjust its calculation of scores of the criteria to determine whether the sentences are adjacency pairs based on intrinsic and/or extrinsic input. An embodiment of the adjacency pair module 146 adjusts its weighting of the criteria to determine whether the sentences are adjacency pairs based on intrinsic and/or extrinsic input.

In at least one embodiment, the adjacency pair module 146 extracts adjacency pairs based on the scores for the potential adjacency pairs. An embodiment of the adjacency pair module 146 extracts all adjacency pairs that pass a threshold score regardless of whether there is a co-occurrence of the same sentence between the adjacency pair matches. In another embodiment, the adjacency pair module 146 extracts only the highest scored adjacency pair where there is a co-occurrence of the same sentence between two or more adjacency pair matches. The adjacency pair module 146 can also adjust its threshold score and/or rank based on intrinsic and extrinsic input.

At least one embodiment of the adjacency pair module 146 generates questions based on indicative statements or information units authored by the first party to generate questions and answer pairs. For purposes of this description, "indicative statements" are statements that provide information about subjects, actions, direct and indirect objects, place, or time. For purposes of this description, "information units" are single words or phrases that provide information about subjects, actions, direct and indirect objects, place, or time. The adjacency pair module 146 can generate question and answer pairs based on, but not limited to one or more of the following generative sub-processes: identify potential indicative statements or information units; generate the adjacency pairs; and extract the generated adjacency pairs.

It is apparent to a person of ordinary skill in the art that the generative sub-processes may overlap and be combined with the other sub-processes that the adjacency pair module 146 performs.

In an embodiment, the adjacency pair module 146 identifies all indicative statements or information units from a first party to create question and answer pairs. The adjacency pair module 146 calculates the score of indicative statements based on certain sub-processes. Further, the adjacency pair module 146 can calculate the scores of indicative statements based on one or more of the following sub-processes: the statement length wherein statements that have more words are more likely to have information related to subjects, actions, direct and indirect objects, place, or time; and the statement density wherein statements that have more words that relate to subjects, actions, direct and indirect objects, place, or time per word are more likely to be relevant. An embodiment of the adjacency pair module 146 can weigh the score of the output of two or more of the following sub-processes the same or differently: the statement length; and the statement density. The adjacency pair module 146 can preferably adjust its calculation of the scores of the sub-processes based on intrinsic and extrinsic input. The adjacency pair module 146 can further adjust its weighting of the score of the sub-processes based on intrinsic and extrinsic input.

Additionally, in at least one embodiment the adjacency pair module 146 scores information units based on certain sub-processes. Preferably, the adjacency pair module 146 scores information units based on, but not limited to one or more of the following sub-processes: proper noun priority wherein proper nouns are ranked higher than other nouns, adjectives, articles, and relative clauses; subject priority wherein subjects are ranked higher than other nouns; action priority wherein action verbs are ranked higher than auxiliary and copular verbs; and verb priority wherein verbs are ranked higher than adverbs, adverbial clauses, and prepositional phrases. The adjacency pair module 146 can weigh the score of the output of two or more of the following sub-processes the same or differently: proper noun priority; subject priority; action priority; and verb priority. The adjacency pair module 146 can adjust its calculation of the scores of the sub-processes based on intrinsic and extrinsic input. Preferably, the adjacency pair module 146 can adjust its weighting of the score of the sub-processes based on intrinsic and/or extrinsic input.

An embodiment of the adjacency pair module 146 generates the adjacency pairs through certain sub-processes. The adjacency pair module 146 can generate adjacency pairs from all indicative statements and/or information units or from only indicative statements and/or information units that meet certain thresholds of total scores. Where the adjacency pair module 146 only generates adjacency pairs from indicative statements and/or information units that meet certain thresholds of total scores, the adjacency pair module 146 can adjust the thresholds based on intrinsic and/or extrinsic input.

Preferably, the adjacency pair module 146 can generate adjacency pairs through question and answer templates. An aspect of the adjacency pair module 146 can break down indicative statements into answer templates and translate the answer templates into "who," "what" "where" "when" "how" and "how much" question templates. For an example, the adjacency pair module 146 can break down the sentence, "When I was four years-old, my mother bought the Acme motorcycle in Oregon for $3,000," into the following question and answer template pairs: "When did your mother buy the Acme motorcycle?/My mother bought the Acme motorcycle when I was four years-old"; "Who bought the Acme motorcycle?/My mother"; "What did your mother buy in Oregon for $3,000 when you four years-old/The Acme motorcycle"; and "How much did your mother pay for the Acme motorcycle/My mother bought the Acme motorcycle for $3,000".

One aspect of the adjacency pair module 146 can input information units into answer templates and translate the answer templates into "who," "what" "where" "when" "how" and "how much" question templates. For an example, the a adjacency pair module 146 can input the information unit "My mother, the nurse," into the question and answer template pair, "Who is your mother/My mother is a nurse".

In at least one embodiment, the adjacency pair module 146 operably works with the threading module 144 to extract adjacency pairs from communications that are likely from the same communication sequence as outlined above. At least one embodiment of the adjacency pair module 146 extracts adjacency pairs from the threaded email communications based on, but not limited to one or more of the following sub-processes: identify potential adjacency pairs, calculate ranks and/or scores for the candidate adjacency pairs, and extract adjacency pairs. The sub-process, which identifies potential adjacency pairs, may be the same as the corollary sub-process for threaded email communications.

In one embodiment, one or more of the following sub-processes are different than their corollary sub-process for threaded email communications: calculate scores for the candidate adjacency pairs and extract adjacency pairs. In one embodiment, the scores for the candidate adjacency pairs are scored lower than comparable candidate adjacency pairs in threaded email communications. Additionally, the threshold to extract candidate adjacency pairs may be higher than the threshold to extract candidate adjacency pairs in the threaded email communications. The adjacency pair module 146 can adjust its relative scoring and threshold to extract based on intrinsic and/or extrinsic input.

At least one embodiment includes a summarizing module 148. In at least one embodiment, the input for the summarizing module 148 either includes text-based data that may have been processed by one or more of the other modules 140, 142, 144, 146. An embodiment of the summarizing module 148 extracts sentences and/phrases from more than one threaded email communication. In another aspect of the invention, the summarizing module 148 extracts sentences and/phrases from only one email communication. The summarizing module 148 can extract summaries from adjacency pairs wherein the summarizing module 148 can extract only the adjacency pairs that are most significant to understanding the electronic communications.

When the summarizing module 148 extracts sentences and/or phrases from the text-based data through extractive sub-processes, the summarizing module 148 can complete sub-processes which include, but are not limited to, one or more the following sub-processes: content identification, content sequencing, and content paring. It is known in the art that content identification can occur through unsupervised or supervised methods.

In at least one embodiment, the summarizing module 148 completes content identification through unsupervised methods which include, but are not limited to, one or more the following methods: the word frequency method as developed by Luhns; methods using centroid-based algorithms such as TF IDF or log-likelihood ratio (LLR); or methods using centrality-based algorithms that compute co-occurrence within the sentences between shared words, shared word classes, shared n-grams, longest common subsequence or other lexical information.

Additionally, in at least one embodiment the summarizing module 148 completes content identification through supervised methods which include, but are not limited to, one or more the following methods: the word frequency method as developed by Luhns; methods using centroid-based algorithms such as TF IDF or log-likelihood ratio (LLR); or methods using centrality-based algorithms that compute co-occurrence within the sentences between lexical features such as words, word classes, n-grams, etc.; the sentence/phrase positioning method wherein sentences that begin or end paragraphs are identified as potentially key sentences; the cue method wherein phrases/words that have effect on the relative significance of a sentence are utilized to identify key sentences/phrases (e.g. 'In conclusion,' 'Therefore,' 'First' etc.); the title/headline word method wherein headlines such as the subject line are presumed to have significance; the sentence length method wherein shorter sentences are excluded from the summary because they have less information than longer sentences; the proper noun method wherein sentences having proper nouns are deemed important for the summary; and the proximity method wherein the distance between entities in a text determine their relative relationship.

When the summarizing module 148 is summarizing one email communication, the summarizing module 148 can complete content sequencing through methods which include, but are not limited to, one or more the following methods: the natural ordering method wherein the extracted sentences are ordered in the same sequence as found in the email communication; and the ranking method wherein the extracted sentences that ranked as most informative are sequenced first in the summary.

When the summarizing module 148 is summarizing more than one email communication, the summarizing module 148 can complete content sequencing through methods which include, but are not limited to, one or more the following methods: the chronological method wherein the extracted sentences are ordered based on the chronology of the electronic communications from newest to oldest; the majority method wherein extracted sentences are ordered based on their relative frequency among the email communications; and the topic method wherein the extracted sentences are ordered based on topic clusters among the electronic communications ordering extracts sentences from their original documents and clusters them into topic clusters.

Preferably, the summarizing module 148 can complete content paring through methods which include, but are not limited to, one or more the following methods: removing adverbs ((e.g. 'Thus,' 'Further,' 'Also' etc.), adverbial clauses (e.g. 'while I was sleeping'), and prepositional phrases ('in the rain'); removing relative clauses such as appositives (e.g. 'Billy and Deron, my Canadian next door neighbors,' 'Ciudad Juarez, the largest city in the state of Chihuahua,' etc.) and attributive clauses (e.g. 'Cien Años de Soledad, Gabriel Garcia Marquez's seminal work,'); and using word hierarchies to generalize (e.g. 'Benedict bought a cocker spaniel and a bulldog' into 'Benedict bought two dogs').

When the summarizing module 148 generates novel sentences and/or phrases from the email communication through abstractive sub-processes, an embodiment of the summarizing engine can complete the generative sub-processes through either structured or semantic methods.

In at least one embodiment, the summarizing module 148 employs structured methods which include, but are not limited to, one or more the following methods: the tree base method wherein this method uses dependency grammar trees, algorithms to select content, and language generators and algorithms to generate summaries; the template method wherein this method uses extraction rules to identify important text related to particular topics which then fill template slots to create summaries; the ontology method wherein the method may include fuzzy ontology methods to create summaries; the lead and body phrase method wherein the method rewrites the lead sentence through inserting and substituting phrases between sentences within a text; and the rule method wherein the method extracts aspects and categories from the corpora, identifies candidates that best answer aspects of a category, and generates summary sentences through generation templates.

In an additional or alternative embodiment, the summarizing module 148 employs semantic methods which include, but are not limited to, one or more the following methods: the multimodal semantic model method wherein the method creates a semantic model based on concepts, ranks the relevance of concepts through co-occurrence and other techniques, and generates sentences based on core concepts; the information item method wherein the method uses texts features to generate sentences, ranks these sentences based on their average Document Frequency (DF) scores, and sequences these sentences based on their relative DF scores; and the semantic graph method wherein the methods represents corpora through an Rich Semantic Graph (RSG), reduces the initial RSG through heuristic rules, and generates a summary by translating the reduced RSG into text.

Additionally, in at least one embodiment, the information retrieval computer system 100 includes retrieval agent module 150. The retrieval agent module 150 retrieves text from the data storage 110 that relates to drafting first party communications. At least one embodiment of the retrieval agent module 150 employs fencing methods that restrict and grant access to the retrieval agent module 150. These fencing methods can be based on access rules. In one preferred embodiment, a first party can selectively grant or restrict the retrieval agent module 150 access based on access rules which include, but are not limited to, one or more the following: second party email client domain provider wherein the fencing methods grant or restrict the retrieval agent module 150 access based on email client domain provider; second party email client identifiers wherein the fencing methods grant or restrict the retrieval agent module 150 access based on second party email client identifiers; second party email client profile wherein the fencing methods grant or restrict the retrieval agent module 150 access based on second party email client profile; and second party email communications content and subject lines wherein the fencing methods grant or restrict the retrieval agent module 150 access based on second party email communications content and/or subject lines. One preferred method to enact fencing is through virtual folders wherein certain content can be placed in these virtual folders and the first party can grant or restrict access to second parties based on access rules.

In at least one embodiment, a first party can activate the retrieval agent module 150 to retrieve text. For example, the first party can activate the retrieval agent module 150 through, but not limited to one or more of the following actions: one or more functional keystrokes such as function keystrokes; voice activation; human interface devices such as a computer mouse selecting a graphic user interface button; one or more syntactic keystroke into a search box; one or more syntactic keystroke into email communications' header and/or body fields; selection of an email communication's response or forward functions. In one embodiment, the party can set settings that define the mechanisms by which the retrieval agent module 150 is activated.

The retrieval agent module 150 is capable of retrieving different types of text-based data which includes, but is not limited to, one or more of the following: single email summaries; threaded email summaries; adjacency pairs; part two of adjacency pairs; part one of adjacency pairs; words; and phrases. The first party preferably can filter the types of texts that the retrieval agent module 150 retrieves.

In at least one embodiment, the retrieval agent module 150 completes certain retrieval sub-processes. The retrieval sub-processes include, but are not limited to, one or more the following sub-processes: the content identification sub-process and the content display sub-process. The retrieval agent module 150 can identify content to retrieve based on, but not limited to one or more of the following criteria: second party email communications' lexical and syntactic features; second party email clients and profiles; first party character input; the timestamp of second party email communications; and first party content searches.

Where the first party is responding to second party email communications, preferably before the first party responds, the second party email communications can undergo certain sub-processes in the retrieval agent module 150 as are outlined above. Additionally, before the first party responds, these second party email communications can undergo certain sub-processes as outlined above from one or more of the following modules: the indexing module 140, the threading module 144; the adjacency pair module 146, and the summarizing module 148. From these sub-processes, one or more of the following texts are extracted and/or indexed from the second party email communications: lexical and syntactic features; threaded email communications; adjacency pairs; and summaries from either threaded email communications or single email communications. These sub-processes can further extract and index: second party email clients and profiles; and the timestamp of the second party email communications.

Based on the second party email communications, the retrieval agent module 150 can identify candidate texts and can score the candidate texts based on their sub-elements relatedness to the second party email communications. The retrieval agent module 150 can weight scores of the sub-elements of the candidate texts the same or differently based on the sub-elements relevance to determine relatedness to the second party email communications. The candidate texts can meet a certain threshold score to be identified as related to the second party communication. Based on intrinsic and extrinsic input, the retrieval agent module 150 can adjust the calculation of the scores, the weights of the scores, and the threshold score for the candidates and their sub-elements.

For an example, the retrieval agent module 150 can identify parts of adjacency pairs from a second party email communication such as a question that forms the first part of a question and answer pair. In one second party email communication, the retrieval agent module 150 can identify the question, "How much are you selling the row house on 14th and Military?" The retrieval engine 40 can identify the named entities, the verb, and the interrogatory in the question ("you" [subject], "row house" [adjective+direct object] "14th and Military" [prepositional object, place], "are selling" [present continuous verb], and "How much" [interrogatory of quantity]). The retrieval agent module 150 can compare the characteristics of the question with characteristics of previous questions (candidate questions) to determine matches. Through NER, word embedding, word disambiguation, and other techniques, the retrieval engine account for different signifiers for the same signified among the candidate questions and the question. The retrieval engine 40 can score candidate questions based on their similarities with the question.

The retrieval agent module 150 can score the following candidate question relatively high because of its similarities with the question, "What is the list price of the house on 1421 Military Drive?" This candidate question forms a question and answer pair with the first party answer, "The row house on 14th and Military is $750,000." The retrieval engine 40 can recognize the following similarities between the question and the candidate question: the prepositional objects dealing with places "14th and Military" and "1421 Military Drive" are similar; the direct object "house" and prepositional object and adjective "row house" are similar; and the interrogatory "How much" in combination with the verb "are selling" are similar to the interrogatory "What" in combination with the subject "list price". The retrieval agent module 150 can weigh the relatedness score of the prepositional objects of place more than the relatedness scores of the other sub-element comparisons because the prepositional objects are proper nouns and therefore more definite.

In addition, the retrieval agent module 150 can identify that the second party communication was sent two days after the candidate text and thus give the candidate question a higher score. The retrieval agent module 150 also can identify that the candidate question came from a similar class of second party email clients as the second part communications and score the candidate question higher. As described before, the retrieval agent module 150 can weigh these sub-elements' scores differently or the same to determine relatedness.

Using the same second party email communication, the retrieval agent module 150 can identify candidate summaries of the previous email communications. The retrieval agent module 150 can identify candidate summaries made from communications sent between the first party and the second party (e.g. First Party: "What areas are you interested in, and what do you want to spend on a home?" Second Party: "I am interested in Takoma Park. I want to spend between $500,000 and $600,000."). The retrieval agent module 150 can also identify candidate summaries made from communications sent between the first party and other second parties (e.g. First Party: "The list price for the row house on 1421 Military Drive is $750,000." Second Party: "That is expensive for Brightwood."). The retrieval agent module 150 can score the candidate summaries' relatedness to the second party email communication based on one or more of the following criteria: the concurrence of email clients and/or profiles wherein candidate summaries that demonstrate concurrence of email clients and/or profiles with the second party communications are scored higher; and lexical and sematic similarities wherein candidate summaries that exhibit many similarities are scored higher. As described before, the retrieval agent module 150 can weigh these sub-elements and/or criteria's scores differently or the same to determine the relatedness of summary candidates.

The retrieval agent module 150 can further identify candidate texts based on first party keystrokes inputted into the following fields: the search box; and the email communications' header and/or body fields. It is known in the art that candidate texts can be retrieved from dictionaries with words ranked based on usage frequencies in the general language. The prior art extrapolates from the inputted text the text most likely follow and makes recommendations; however, the recommendations are often flawed because they are not often tailored to users' word usage and syntax. In an aspect of the embodiment, the retrieval agent module 150 can identify candidate texts and score them based on first party's previous communications and not on general language usage. This embodiment not only can account from first party's word frequency but syntactical frequency when identifying candidate texts.

For an example, the first party is a patent attorney and regularly types the following keystroke sequence "novelty and nonobviousness" which have been extracted and indexed by the IR system preferably as part of an adjacency pair. Subsequently when the patent attorney types "novelty and n," the retrieval agent module 150 can score the word "nonobviousness" higher than the words "no" and "name" even though these terms are used more frequently than "nonobviousness" in common place English. The retrieval agent module 150 notably can score candidate text not only based the first person's word usage (e.g. the patent attorney may still use the words "no" and "name" more frequently than "nonobviousness"), but score based on the context of the inputted sequence.

An aspect of the retrieval agent module 150 can identify candidate texts based on first party keystrokes in conjunction with the characteristics of second party email communications as described above. Using the example above where the second party email communication asked, "How much are you selling the row house on 14th and Military?", the retrieval agent module 150 can identify candidate text such as "The list price for the row house on 1421 Military Drive is $750,000" and can score it higher when the first party inputs the following keystrokes in either the search box or the email communications' fields "The list price 1421 Military". The retrieval agent module 150 can not only identify and score candidate text on first party's word and syntactic usage, but the usage of word and syntax in particular contexts.

One aspect of the retrieval agent module 150 can display candidate texts using display sub-processes. These content display sub-processes can include, but are not limited to one or more of the following sub-processes: display sub-processes; linking sub-processes; and populating processes.

It is known the art that candidate texts may be displayed in an array of different configurations. Preferably, the retrieval agent module 150 can display candidate texts in one or more of the following display configurations: columnar display wherein candidate text is portrayed in a column; row display wherein candidate text is portrayed in a row; and email communication display wherein candidate text is displayed in the email communications' headers or bodies. It is apparent to one skilled in the art that the display configurations can be expanded or minimized based on input by the first party. The display configurations can display one or more candidate texts which can be displayed based on their relatedness scores and/or ranks. The display configurations also can display one or more types of the following candidate texts: single email summaries; threaded email summaries; adjacency pairs; part two of adjacency pairs; part one of adjacency pairs; words; and phrases. The types of candidate texts displayed can be prioritized not only based on relatedness, but based on the types of the candidate texts. In an aspect of the invention, the first party can set settings that define one or more of the following: the display configurations used; the amount of candidate texts displayed; the types of candidate texts displayed; and the prioritization of the types of candidate texts displayed.

In the columnar display, the retrieval agent module 150 can display candidate text in a column. In certain embodiments, the retrieval agent module 150 can display candidate text based on which candidate text has the highest score. In one embodiment, the candidate text is positioned in a continuum of scores where the highest scored candidate text is placed on top of the column and the lowest scored candidate text displayed is placed on the bottom of the column. The candidate texts scored between the highest and lowest are placed in descending order from the top to the bottom. The first party can set settings that define how the candidate texts are displayed in the columns based on their relatedness scores.

In the row display, the retrieval agent module 150 can display candidate text in a row. In certain embodiments, the retrieval agent module 150 can display candidate text based on which candidate text has the highest score. Preferably, the candidate text is positioned in a continuum of scores where the highest scored candidate text is placed on the right of the row and the lowest scored candidate text displayed is placed on the left of the row. The candidate texts scored between the highest and lowest are placed in descending order from right to left. The first party can set the settings that define how the candidate texts are displayed in the rows based on their relatedness scores and rankings.

In the email communication display, the retrieval agent module 150 can display candidate text in the header and/or body of the email communication. One aspect of the retrieval agent module 150 can display only the top scored candidate text. The first party can expand the email communication display to display additional candidate texts through an expand function. The expanded email communication display can be either a columnar display or a row display as previously described. In one embodiment, the first party can set the settings that define whether the email communication display expands to a columnar display or a row display.

An aspect of the retrieval agent module 150 can display links related to the candidate text through linking sub-processes. The retrieval agent module 150 can display links to one of more of the following types of text: single email communications; threaded email communications; adjacency pairs; summaries of single emails; and summaries of threaded email communications. In an embodiment, the first party can define the types of text that they are interested in having links. When the first party selects a link, the retrieval engine 40 can retrieve the text that is linked. Preferably, the retrieval agent module 150 can retrieve and display the linked text so that the first party can simultaneously view the email communication that they are drafting and the linked text.

One aspect of the retrieval agent module 150 can populate email communications headers and/or bodies with retrieved text through populating sub-processes. In the displayed candidate and/or linked texts, the first party can select a populate button wherein the displayed candidate and/or linked texts populate the headers and/or bodies of the email communications. In one preferred embodiment, the first party can select a populate function that is represented through a graphic user interface.

One will appreciate that embodiments disclosed herein can also be described in terms of flowcharts comprising one or more acts for accomplishing a particular result. For example, FIGS. 5 and 6 and the corresponding text describe acts in various systems for performing methods and/or stand-alone methods for parsing bulk message information into intelligent question retrieval models. The acts of FIGS. 5 and 6 are described below.

Figure 5:
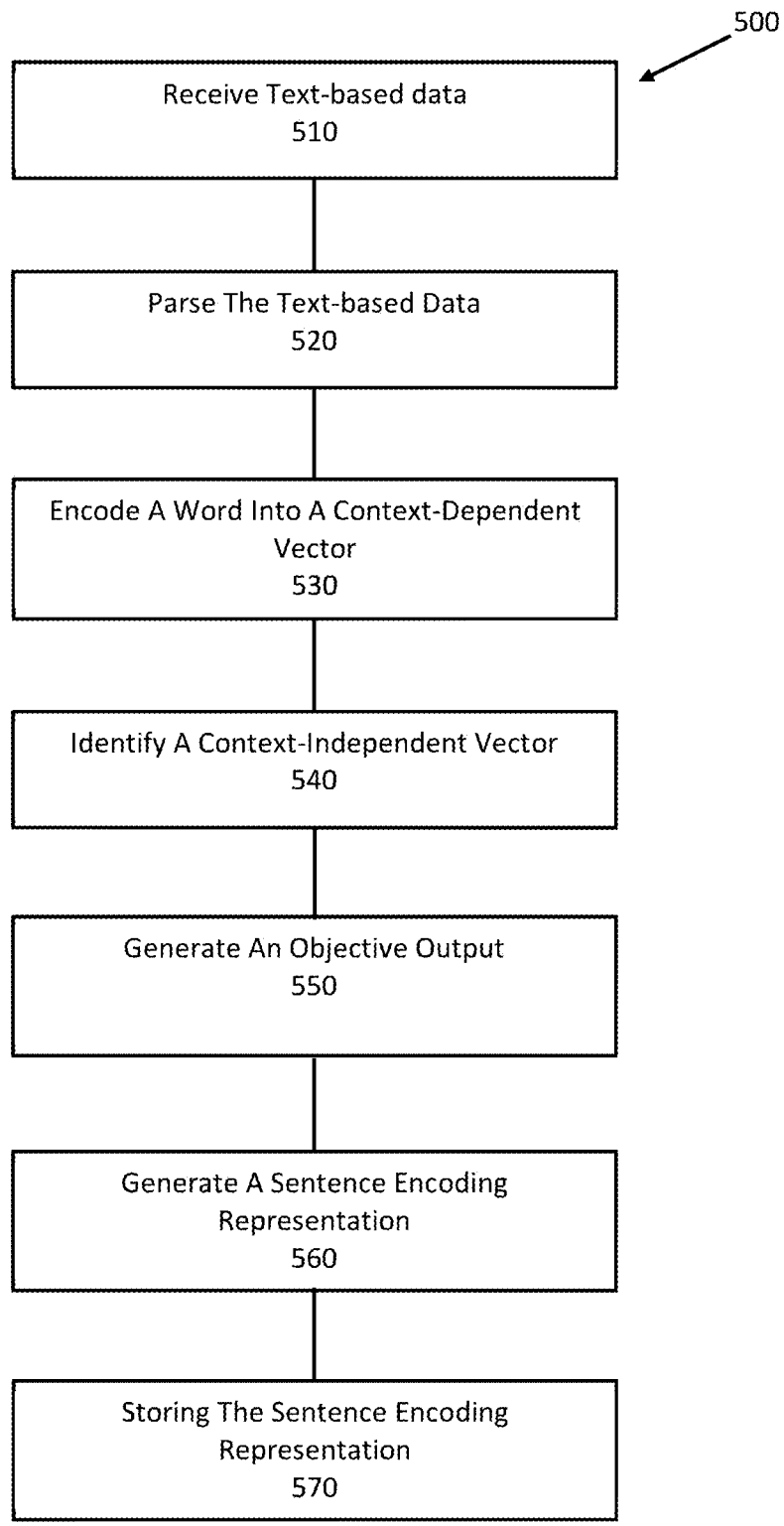
FIG. 5 illustrates a flowchart for an embodiment of a method for parsing bulk message information into intelligent question retrieval models.
Figure 6:
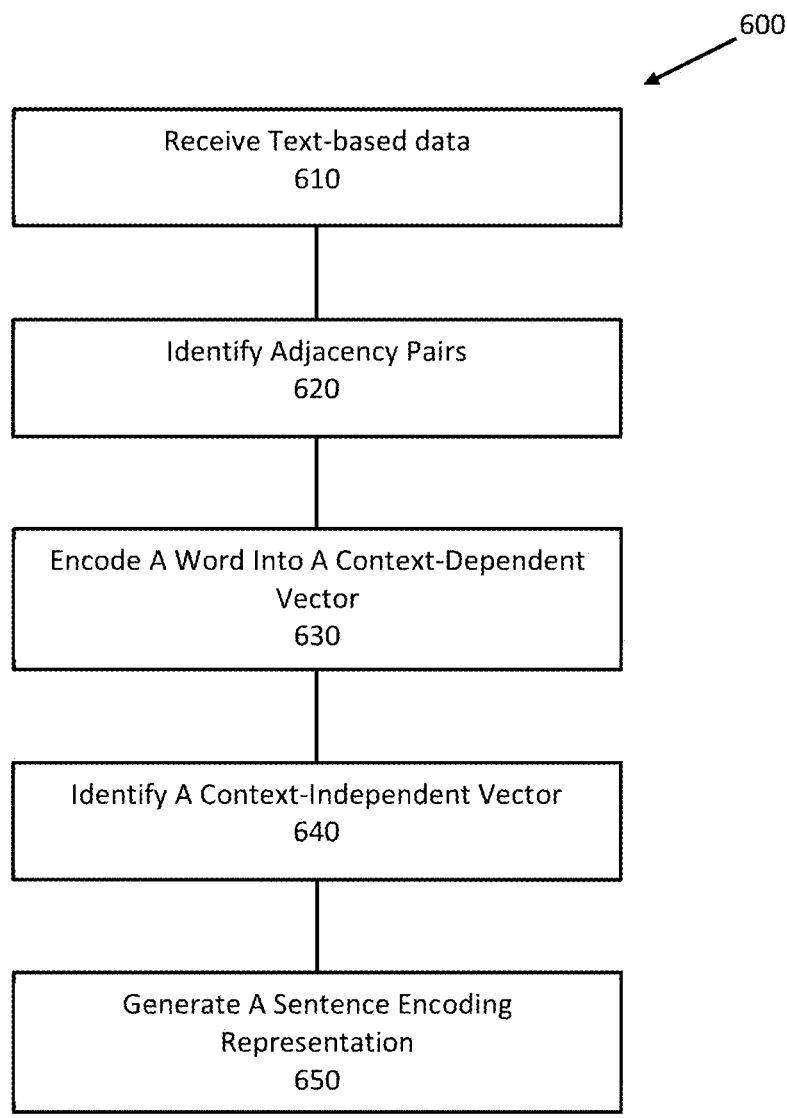
FIG. 6 illustrates a flowchart for another embodiment of a method for parsing bulk message information into intelligent question retrieval models.

For example, FIG. 5 illustrates a flowchart 500 of acts associated with methods for parsing bulk message information into intelligent question retrieval models. The illustrated acts comprise an act 510 of receiving text-based data. Act 510 includes receiving text-based data associated with a particular user. For example, text-based data (also referred to herein as bulk message information) is received by the information retrieval computer system 100 through a network interface 130 from a server 190. One will understand, however, that text-based data can be received from any number of different sources.

The next illustrated act 520 comprises parsing the text-based data. Act 520 includes parsing a word from the text-based data. For example, the processor(s) 120 received text-based data from a mobile device 170. The processor(s) then parse words out of the text-based data, whether that data is emails, messages, or some other content.

Illustrated act 530 comprises encoding a word into a context-dependent vector. Act 530 includes encoding the word into a context-dependent vector, wherein the context-dependent vector indicates the meaning of the word across a semantic space. For example, the processor(s) 120, using the methods and equation described above, encode a word into a context-dependent vector based upon the context of the word within the text-based data.

In addition, illustrated act 540 comprises identifying a context-independent vector. Act 540 includes identifying within a context-independent database a context-independent vector that is associated with the word, wherein the context-independent database comprises mappings of various words to various context-independent vectors based upon definitions of the various words. For example, the information retrieval computer system 100 identifies the word within a database of dictionary based vectors. As such, in this case a context-independent vector is generated that describes the word without context from the text-based data, but instead with only information within a context-independent database.

Illustrated act 550 comprises generating an objective output. Act 550 includes generating an objective output by combining the context-dependent vector and the context-independent vector. For example, the processor(s) 120, using the methods and equation described above, generate an objective output that accounts for both the context-dependent vector and the context-independent vector.

Further still, illustrated act 570 comprises an optional act of storing the sentence encoding representation. Act 570 includes storing the sentence encoding representation within a user-specific dataset that is associated with the particular user. For example, the information retrieval computer system 100 stores a QA database and/or sentence encodings within a user specific dataset 112. As such, the information retrieval computer system 100 is able to generate content an perform searches that are custom to the user's specific way of writing and expression.

FIG. 6 illustrates a flowchart 600 of acts associated with methods for parsing bulk message information into intelligent question retrieval models. The illustrated acts comprise an act 610 of receiving text-based data. Act 610 includes receiving text-based data associated with a particular user. For example, text-based data (also referred to herein as bulk message information) is received by the information retrieval computer system 100 through a network interface 130 from a server 190. One will understand, however, that text-based data can be received from any number of different sources.

The next illustrated act 620 comprises identifying adjacency pairs. Act 620 includes identify adjacency pairs within the words, wherein the adjacency pairs comprise two parts that are communicated by different parties in which a first part is conditionally related to a second part. For example, the adjacency pair module 146 identifies an offer and acceptance pair. In at least one embodiment, the adjacency pair module 146 relies upon complimentary entries within an adjacency pairs dataset.

Illustrated act 630 comprises encoding a word into a context-dependent vector. Act 530 encoding a word associated within the adjacency pair into a context-dependent vector, wherein the context-dependent vector indicates the meaning of the word across a semantic space. For example, the processor(s) 120, using the methods and equation described above, encode a word into a context-dependent vector based upon the context of the word within the text-based data.

In addition, illustrated act 540 comprises identifying a context-independent vector. Act 540 includes identifying within a context-independent database a context-independent vector that is associated with the word, wherein the context-independent database comprises mappings of various words to various context-independent vectors based upon definitions of the various words. For example, the information retrieval computer system 100 identifies the word within a database of dictionary based vectors. As such, in this case a context-independent vector is generated that describes the word without context from the text-based data, but instead with only information within a context-independent database.

Illustrated act 550 comprises generating an objective output. Act 550 includes generating an objective output by combining the context-dependent vector and the context-independent vector. For example, the processor(s) 120, using the methods and equation described above, generate an objective output that accounts for both the context-dependent vector and the context-independent vector.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for parsing bulk message information into intelligent question retrieval models, comprising:
  one or more processors; and
  one or more computer-readable media having stored thereon executable instructions that when executed by the one or more processors configure the computer system to perform at least the following:
    receive text-based data associated with a particular user;
    parse a word from the text-based data;
    encode the word into a context-dependent vector, wherein the context-dependent vector indicates the meaning of the word across a semantic space based upon the context of the word with the text-based data;

identify within a context-independent database a context-independent vector that is associated with the word, wherein the context-independent vector is based upon definitions of the word and without insight into the text-based data;

generate an objective output by combining the context-dependent vector and the context-independent vector and a regularization function; and generate a sentence encoding representation by processing at least a portion of the text-based data through a high-level feature embedded convolutional semantic model to generate numerical representations of questions and answers within the text-based dataset, wherein the sentence encoding representation is generated at least in part based upon the objective output.

2. The computer system of claim 1, wherein the executable instructions include instructions that are executable to configure the computer system to:
parse words from the text-based data; and
identify adjacency pairs within the words.

3. The computer system of claim 2, wherein identifying adjacency pairs comprises:
identifying the presence of a portion of the parsed words within a first entry in an adjacency pair database; and
identifying the presence of another portion of the parsed words within a second entry in the adjacency pair database, wherein the second entry to indicated as being complimentary to the first entry.

4. The computer system of claim 2, wherein the identified adjacency pairs are used to generate the sentence encoding representation.

5. The computer system of claim 1, wherein the context-dependent vector and the context-independent vector are combined at least in part through a skip-gram model.

6. The computer system of claim 1, wherein the context-independent database comprises mappings of various words to various context-independent vectors based upon definitions of the various words.

7. The computer system of claim 1, wherein the text-based data is addressed to the particular user or generated by the particular user.

8. The computer system of claim 1, wherein the text-based data comprises emails.

9. The computer system of claim 1, wherein the executable instructions include instructions that are executable to configure the computer system to:
receive communication text input by the particular user;
map the communication text to the sentence encoding representation; and
based upon the sentence encoding representation, generate a collection of text that is associated with the sentence encoding representation, wherein the collection of text is responsive to the communication text.

10. The computer system of claim 9, wherein the executable instructions include instructions that are executable to configure the computer system to:
identify a first part of a particular adjacency pair within the communication text; and
wherein the collection of text is based upon a second part of the particular adjacency pair.

11. A method for parsing bulk message information into intelligent question retrieval models, comprising:
receiving text-based data associated with a particular user;
parsing a word from the text-based data;
encoding the word into a context-dependent vector, wherein the context-dependent vector indicates the meaning of the word across a semantic space based upon the context of the word with the text-based data;
identifying within a context-independent database a context-independent vector that is associated with the word, wherein the context-independent database comprises mappings of various words to various context-independent vectors based upon definitions of the various words and wherein the context-independent vector is based upon definitions of the word and without insight into the text-based data;
generating an objective output by combining the context-dependent vector and the context-independent vector and a regularization function;
generating a sentence encoding representation by processing at least a portion of the text-based data through a high-level feature embedded convolutional semantic model to generate numerical representations of questions and answers within the text-based dataset, wherein the sentence encoding representation is generated at least in part based upon the objective output; and
storing the sentence encoding representation within a user-specific dataset that is associated with the particular user.

12. The method of claim 11, further comprising:
parsing words from the text-based data; and
identifying adjacency pairs within the words.

13. The method of claim 12, wherein identifying adjacency pairs comprises:
identifying the presence of a portion of the parsed words within a first entry in an adjacency pair database; and
identifying the presence of another portion of the parsed words within a second entry in the adjacency pair database, wherein the second entry to indicated as being complimentary to the first entry.

14. The method of claim 12, wherein the identified adjacency pairs are used to generate the sentence encoding representation.

15. The method of claim 11, wherein the context-dependent vector and the context-independent vector are combined at least in part through a skip-gram model.

16. The method of claim 11, wherein the text-based data is addressed to the particular user or generated by the particular user.

17. The method of claim 11, wherein the user-specific dataset consists of data related to the particular user.

18. The method of claim 11, further comprising:
receiving communication text input by the particular user;
mapping the communication text to the sentence encoding representation; and
based upon the sentence encoding representation, generating a collection of text that is associated with the sentence encoding representation, wherein the collection of text is responsive to the communication text.

19. The computer system of claim 18, wherein the executable instructions include instructions that are executable to configure the computer system to:
identifying a first part of a particular adjacency pair within the communication text; and
wherein the collection of text is based upon a second part of the particular adjacency pair.

20. A computer system for parsing bulk message information into intelligent question retrieval models, comprising:
one or more processors; and
one or more computer-readable media having stored thereon executable instructions that when executed by the one or more processors configure the computer system to perform at least the following:

receive text-based data associated with a particular user;

identify adjacency pairs within the words, wherein the adjacency pairs comprise two parts that are communicated by different parties in which a first part is conditionally related to a second part;

encode a word associated within the adjacency pair into a context-dependent vector, wherein the context-dependent vector indicates the meaning of the word across a semantic space based upon the context of the word with the text-based data;

identify within a context-independent database a context-independent vector that is associated with the word, wherein the context-independent database comprises mappings of various words to various context-independent vectors based upon definitions of the various words and wherein the context-independent vector is based upon definitions of the word and without insight into the text-based data; and generate an objective output by combining the context-dependent vector and the context-independent vector and a regularization function.

* * * * *